US011783015B2

(12) United States Patent
Donovan et al.

(10) Patent No.: US 11,783,015 B2
(45) Date of Patent: Oct. 10, 2023

(54) MANAGEMENT SYSTEMS FOR PERSONAL IDENTIFYING DATA, AND METHODS RELATING THERETO

(71) Applicant: MASTERCARD INTERNATIONAL INCORPORATED, Purchase, NY (US)

(72) Inventors: Jennifer L. Donovan, Wentzville, MO (US); Gary Adler, Teaneck, NJ (US); James Holladay, Foristell, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 96 days.

(21) Appl. No.: 17/145,155

(22) Filed: Jan. 8, 2021

(65) Prior Publication Data

US 2021/0133300 A1    May 6, 2021

Related U.S. Application Data

(63) Continuation of application No. 15/850,898, filed on Dec. 21, 2017, now Pat. No. 10,891,359.

(51) Int. Cl.
*G06F 21/30*        (2013.01)
*G06F 21/64*        (2013.01)
(Continued)

(52) U.S. Cl.
CPC .......... *G06F 21/30* (2013.01); *G06F 11/3476* (2013.01); *G06F 16/2457* (2019.01);
(Continued)

(58) Field of Classification Search
CPC .... G06F 21/30; G06F 21/6245; G06F 21/645; H04L 63/10; H04L 63/20
See application file for complete search history.

(56) References Cited

U.S. PATENT DOCUMENTS 6,725,240 B1    4/2004  Asad et al.
9,325,715 B1    4/2016  Chereshnev et al.
(Continued)

OTHER PUBLICATIONS

Asaj, N. • Wiedersheim, B. • Held, A. • Weber, M .; Towards an Identity-Based Data Model for an Automotive Privacy Process; 2012 International Conference on Privacy, Security, Risk and Trust and 2012 International Confernece on Social Computing (pp. 789-796); (Year: 2012).*

(Continued)

*Primary Examiner* — Jahangir Kabir
*Assistant Examiner* — Chao Wang
(74) *Attorney, Agent, or Firm* — Harness, Dickey & Pierce, P.L.C.

(57) ABSTRACT

Systems and methods are provided for managing personal identifying information (PII). An exemplary method includes receiving, from a requestor, a request to remove PII for at least one individual from multiple service providers. In response, a computing device authenticates the requestor, determines whether a restriction on the PII or the individual applies to the request, and broadcasts the request to the service providers. The computing device receives a response to the request from each of the service providers indicating removal of the PII and compiles a reply to the request, based on each response, where the reply includes a confirmation of removal of the PII. The computing device then transmits the reply to the requestor and logs the request from the requestor and the response from each of the services providers in an audit data structure, thereby permitting compliance with PII controls to be demonstrated.

14 Claims, 3 Drawing Sheets

(51) Int. Cl.
*G06F 21/62* (2013.01)
*H04L 9/40* (2022.01)
*G06F 11/34* (2006.01)
*G06F 16/2457* (2019.01)

(52) U.S. Cl.
CPC ........ *G06F 21/6245* (2013.01); *G06F 21/645* (2013.01); *H04L 63/10* (2013.01); *H04L 63/20* (2013.01)

(56) References Cited

U.S. PATENT DOCUMENTS

| | | | | |
|---|---|---|---|---|
| 2004/0087338 | A1* | 5/2004 | Natsuno | G06Q 30/06 455/558 |
| 2008/0243861 | A1* | 10/2008 | Wassingbo | G06F 16/434 |
| 2011/0137817 | A1 | 6/2011 | Roumeliotis et al. | |
| 2013/0111545 | A1 | 5/2013 | Sharma et al. | |
| 2013/0125202 | A1 | 5/2013 | Sprague et al. | |
| 2013/0232552 | A1* | 9/2013 | Brush | G06F 21/6263 726/4 |
| 2014/0059355 | A1 | 2/2014 | Schuette et al. | |
| 2014/0372301 | A1* | 12/2014 | Anamanamuri | G06Q 20/384 705/44 |
| 2016/0371471 | A1 | 12/2016 | Patton et al. | |
| 2017/0140174 | A1* | 5/2017 | Lacey | G06Q 20/4016 |
| 2017/0195698 | A1 | 7/2017 | Patrick et al. | |
| 2018/0329940 | A1* | 11/2018 | Tiku | G06F 9/546 |
| 2019/0197217 | A1 | 6/2019 | Donovan et al. | |
| 2019/0253431 | A1 | 8/2019 | Atanda | |

OTHER PUBLICATIONS

Subrata Acharya • Anoli Patel; Towards the design of a comprehensive data de-identification solution; 2017 IEEE International Conference on Bioinformatics and Biomedicine (BIBM) (pp. 1-8); (Year: 2017).*

Gerald Daeuble • Deniz Oezcan • Christina Niemoeller • Michael Fellmann • Markus Nuettgens • Oliver Thomas; Information Needs of the Mobile Technical Customer Service; 2015 48th Hawaii International Conference on System Sciences (pp. 1018-1027); (Year: 2015).*

U.S. Appl. No. 15/850,898, filed Dec. 21, 2017, Donovan et al.

Akeel A. Thlunoon Kashif Kifayat; Enforcing Access Control Models in System Applications by Using Aspect- Oriented Programming: A Literature Review; 2017 10th International Conference on Developments in eSystems Engineering (DeSE) (pp. 100-105); (Year: 2017).

Kawait Univ., Kuwait; Software Engineering Interpretation of Information Processing Regulations; 2008 32nd Annual IEEE. International Computer Software and Applications Conference (pp. 271-274); (Year: 2008) W Stuart Jacobs; Security Systems Engineering; Wiley—IEEE Press 2011 (Edition: 1, pp. 512); (Year: 2011).

* cited by examiner

MANAGEMENT SYSTEMS FOR PERSONAL IDENTIFYING DATA, AND METHODS RELATING THERETO

CROSS-REFERENCE TO RELATED APPLICATION

This application is a continuation of U.S. patent application Ser. No. 15/850,898, filed Dec. 21, 2017. The entire disclosure of the above application is incorporated herein by reference.

FIELD

The present disclosure generally relates to systems and methods for use in managing personal identifying data, and in particular, to systems and methods for use in managing personal identifying data consistent with restrictions on the data, in responses to requests related to the data.

BACKGROUND

This section provides background information related to the present disclosure which is not necessarily prior art.

Network transactions are known to relate to a variety of different aspects, ranging from education to financial transactions. What's more, the network transactions often involve individuals, where information associated with the individuals is included in the transactions. The information, which is specific to the individuals, may be referred to as personal identifying data or information (or PII). PII is any data that could potentially identify a specific individual. The PII does not have to be exclusive to a particular individual, for example, it does not have to include the individual's name, address, birth date, social security number, etc., but will often identify the individual to the exclusion of others. As can be appreciated, the more PII that is provided for an individual, the more specific an identification may be for the individual. In connection therewith, it is known for entities that participate in (or otherwise facilitate) network transactions to control PII for the individuals involved in the network transactions, consistent with various rules and regulations such as the General Data Protection Regulation (GDPR), which provides for data privacy rights and requirements for entities that solicit and retain PII.

SUMMARY

This section provides a general summary of the disclosure, and is not a comprehensive disclosure of its full scope or all of its features. Aspects and embodiments of the disclosure are set out in the accompanying claims.

According to an aspect of the present disclosure, there is provided a computer-implemented method for use in managing personal identifying information, where the method includes: receiving, from a requestor, a request to remove personal identifying information (PII) for at least one individual from multiple service providers; in response to the request, authenticating, by a computing device, the requestor; determining, by the computing device, a restriction on the PII or the at least one individual, which applies to the request; broadcasting, by the computing device, the request, subject to the determined restriction, to the multiple service providers, whereby, in response to the request, the multiple service providers remove the PII for the at least one individual from a memory associated with the multiple service providers; receiving, by the computing device, at least one response to the request from each of the multiple service providers, each response including an indication of removal of the PII of the at least one individual from the memory associated with the respective one of the multiple service providers; compiling, by the computing device, a reply to the request based on the at least one response from each of the multiple service providers, the reply including a confirmation of removal of the PII for the at least one individual; transmitting the reply to the requestor; and logging, by the computing device, the request from the requestor, and the at least one response from each of the multiple service providers in an audit data structure, thereby permitting compliance with PII controls to be demonstrated.

DRAWINGS

The drawings described herein are for illustrative purposes only of selected embodiments and not all possible implementations, and are not intended to limit the scope of the present disclosure:

Corresponding reference numerals indicate corresponding parts throughout the several views of the drawings.

DETAILED DESCRIPTION

Figure 1:
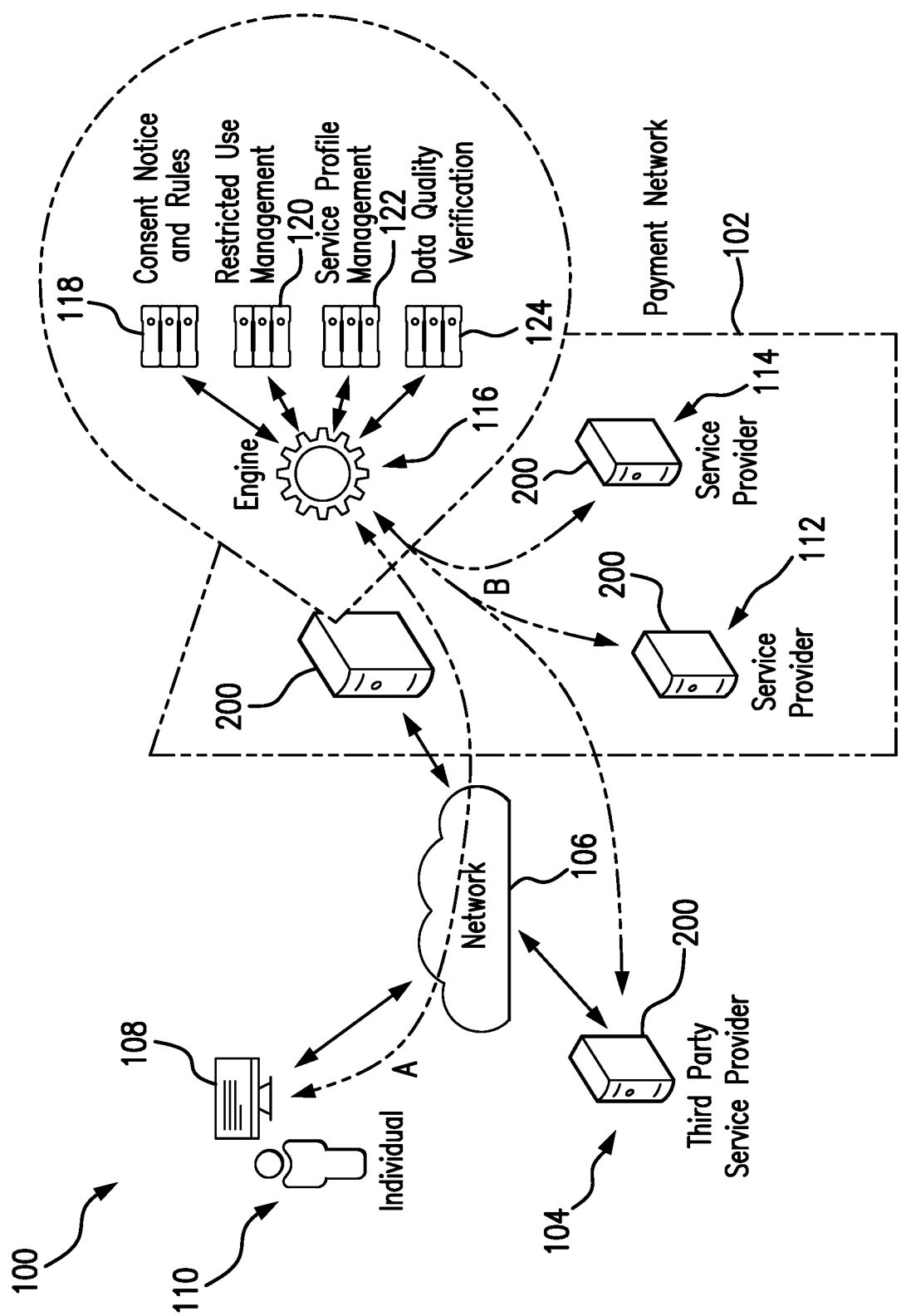
FIG. 1 illustrates an exemplary system for use in managing personal identifying information, and including one or more aspects of the present disclosure.

Exemplary embodiments will now be described more fully with reference to the accompanying drawings. The description and specific examples included herein are intended for purposes of illustration only and are not intended to limit the scope of the present disclosure.

Network transactions typically involve one or more entities and, further, often involve the exchange of personal identifying data or information (or PII) for individuals involved in the transactions. For example, financial transactions (and other network transactions) associated with services related to financial accounts often rely on PII to ensure proper exchange of funds in connection with the transactions. The entities involved in such transactions receive the PII and, in some instances, store the PII to not only facilitate the transactions but to also evidence the transactions and provide one or more further services (e.g., fraud services, advertising services, etc.). In addition, apart from financial transactions, the same or different entities may include employees, which are also associated with PII collected and stored by the entities.

Further, the proliferation of network transactions over the Internet has resulted in a vast number of entities and services provided thereby, storing and controlling a vast amount of PII in disparate locations. Individuals who, for example, routinely participate in various types of Internet transactions are thus faced with the problem of tracking and/or determining what PII is stored and/or controlled by entities and/or services involved in those transactions. In turn, and in view of various rules and regulations such as the General Data Protection Regulation (GDPR), which provides for data privacy rights and requirements for entities that solicit and retain PII, the entities (and services provided thereby) that participate in and/or facilitate the vast numbers of network transactions over the Internet are presented with the problem of properly managing PII for individuals in compliance with applicable rules and regulations.

Uniquely, the systems and methods herein provides for management of PII obtained/collected in connection with such network transactions at a centralized location, whereby the individuals (e.g., consumers, customers, employees, employees of consumers/customers, etc.) and/or entities (broadly, requestors) involved in the transactions may request different actions and/or controls related to the PII. Through implementation of the PII at the centralized location, responses to the requests are more likely to be consistent with applicable restrictions for the requestors and/or the individuals' PII. In particular herein, a management engine is configured to receive a request related to PII from a requestor, for example, for accounting, scrubbing, or transfer of PII, etc. After authentication of the request, the engine employs a restricted use management and a service profile management to determine whether the request is permitted and/or to identify applicable restrictions for the request. Thereafter, the management engine broadcasts the request for PII, consistent with the permissions/restrictions, to services associated with the management engine and potentially other services (e.g., third party services, etc.). Depending on the controls and/or actions of the request, the management engine then gathers and verifies responses from the service provider(s), via a data quality verification, and compiles a reply specific to the initial PII request. The management engine then returns the reply to the requestor. The reply includes, for example, a description of the PII (e.g., via metadata, etc.), the PII, and/or a confirmation (e.g., PII scrub complete, PII transfer complete, etc.). As can be appreciated, by use of the management engine, the PII may be managed from the central location even when the PII is subject to disparate controls (e.g., associated with controllers of the PII, associated with owners of the PII, etc.), such that rules and/or tags for restrictions of the PII may be applied to the disparate data and the requestors for ease of PII management, regulatory compliance and integration.

FIG. 1 illustrates an exemplary system 100 for implementing a process that may be utilized for management of PII for individuals or entities, whereby the PII is managed consistent with certain regulations, etc. The system 100 is illustrated as being specific to financial services (e.g., payment account services, etc.). However, it should be appreciated that other system embodiments may be directed to other subject matter, which may be related or unrelated to financial services, and that still comprises PII controllers and/or processors. whereby the unique features described herein are still applicable.

In the illustrated embodiment, the system 100 includes a payment network 102 and a third party service provider 104, each coupled to a network 106. The network 106 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 106 may include multiple different networks, such as a private payment transaction network made accessible by the payment network 102 to one or more banking institutions (e.g., third party service provider 104, etc.) and, separately, the public Internet, which may provide interconnection between the payment network 102 and a communication device 108 associated with an individual 110, etc.

The payment network 102 in the system 100 is configured to facilitate financial services, including, specifically, authorization, clearing and settlement of payment account transactions. In connection therewith, the payment network 102 includes multiple service providers associated with different services that may be applicable to the payment network 102 in general and/or the financial services supported thereby, including, for example, service provider 112 and service provider 114, etc. That said, services may include, generally, collection, creation, storage, deletion, and aggregation of PII, or other suitable operations related to PII, etc. In the illustrated embodiment, the service providers 112 and 114 are included within the payment network 102, as indicated by the dotted box in FIG. 1. That said, it should be appreciated that one or both of the service providers 112 and 114 may be only partially included within the payment network 102 or may be separate from the payment network 102, and that other entities may aid and/or participate in the services offered thereby.

The service providers 112 and 114 associated with the payment network 102 are configured to provide services that may be internal or external to the payment network 102. Specifically, for example, the payment network 102 is configured to interact with entities and/or individuals (e.g., employees, etc.) therein, whereby the payment network 102 provides internal services. Such internal services may be related to human resources, employee services, etc. Conversely, the service providers 112 and 114 may provide external services, which are utilized by entities outside of the payment network 102, including, for example, the third party service provider 104, etc. Such external services may include, for example, payment processor services (e.g., MoneySend® or MasterPass® services by MasterCard International, ACH Processor services, Payment Gateway services, InControl services, etc.), business-to-business (B2B) services (e.g., WorkDay® services and SalesForce. com® services, etc.), consumer services (e.g., Priceless Cities, etc.), etc. With that said, the individual 110 may be an employee of one of the service providers 112 and 114, whereby the services as they relate particularly to the individual 110 may be internal to the service providers 112 and 114, but again outside to the payment network 102. In connection therewith, whether the services are internal or external, the payment network 102, and more specifically, the service providers 112 and 114, are exposed to PII of individuals (including the individual 110), whether as customers or employees of the payment network 102, or employees of service providers 112 and 114 (e.g., customers, etc.), etc. And, the service providers 112 and 114 are configured to collect and store the PII in memory therein. In this manner, each of the service providers 112 and 114 is a controller or owner of PII.

Similarly, the third party service provider 104 in the system 100 includes one or more services, which may be related to the payment network 102 and/or to payment account transactions in general, or otherwise. For example, the third party service provider 104 may include a financial institution, such as an issuer of payment accounts used in payment account transactions processed by the payment network 102, a merchant involved in such payment account transactions, and/or an acquirer associated with the merchant and involved in the payment account transactions, etc. In connection with the services offered, the third party service provider 104, like the service providers 112 and 114, may be exposed to PII. Depending on the particular services offered, the third party service provider 104 may then be configured to store the PII in memory therein. In this manner, the third party service provider 104 is also a controller or owner of PII in its possession. The third party service provider 104 may operate independent of the service providers 112 and 114, in some implementations, or it may be reliant thereon in others. For example, the third party service provider 104 may include a financial institution that issued a payment account to the individual 110, whereby the third party service provider 104 is involved in payment account transactions directed to the individual's payment account. In such an example, the third party service provider 104 may rely on the service provider 112, for example, for fraud scoring services, whereby PII for the individual 110 is passed to the service provider 112, or the third party service provider 104 may provide its own fraud score services, whereby limited, or no, PII is passed to the service provider 112.

In general, each of the service providers 104, 112, and 114 in the system 100 perform activities on PII such as collection, creation, storage, scrubbing and aggregation, etc. The PII may include, without limitation, full names of individuals, home addresses, phone numbers, email addresses, birth dates, birth locations, social security numbers, national identification numbers, passport numbers, credit card numbers, biometrics, driver's license numbers, etc. It should be appreciated that more or less or different information may be included within PII, as used herein, for one or more individuals, whereby the PII (and its content) may be different between the different individuals.

In the illustrated system 100, the individual 110 includes a person whose PII is collected and/or stored by one or more of the service providers 104, 112, and 114. For example, as described above, the individual 110 is a holder of the payment account issued by the third party service provider 104, and may further be a participant of services provided by the service providers 112 and 114 (e.g., MasterPass® services, etc.). In this manner, the individual 110 will have a relationship with the third party service provider 104 and/or the payment network 102, upon which the requests described herein may be based. Further, the individual 110 may be an employee of the payment network 102 (e.g., including one or more of the service providers 112 and 114 as described above, etc.) and/or the third party service provider 104, whereby the individual 110 has a different relationship with the payment network 102 and/or the third party service provider 104, but still a relationship none-the-less upon which the requests described herein may be based. What's more, the PII collected and/or stored by with the payment network 102 and/or the third party service provider 104 may be the same or different PII for the individual 110 for the different types of relationships.

Figure 2:
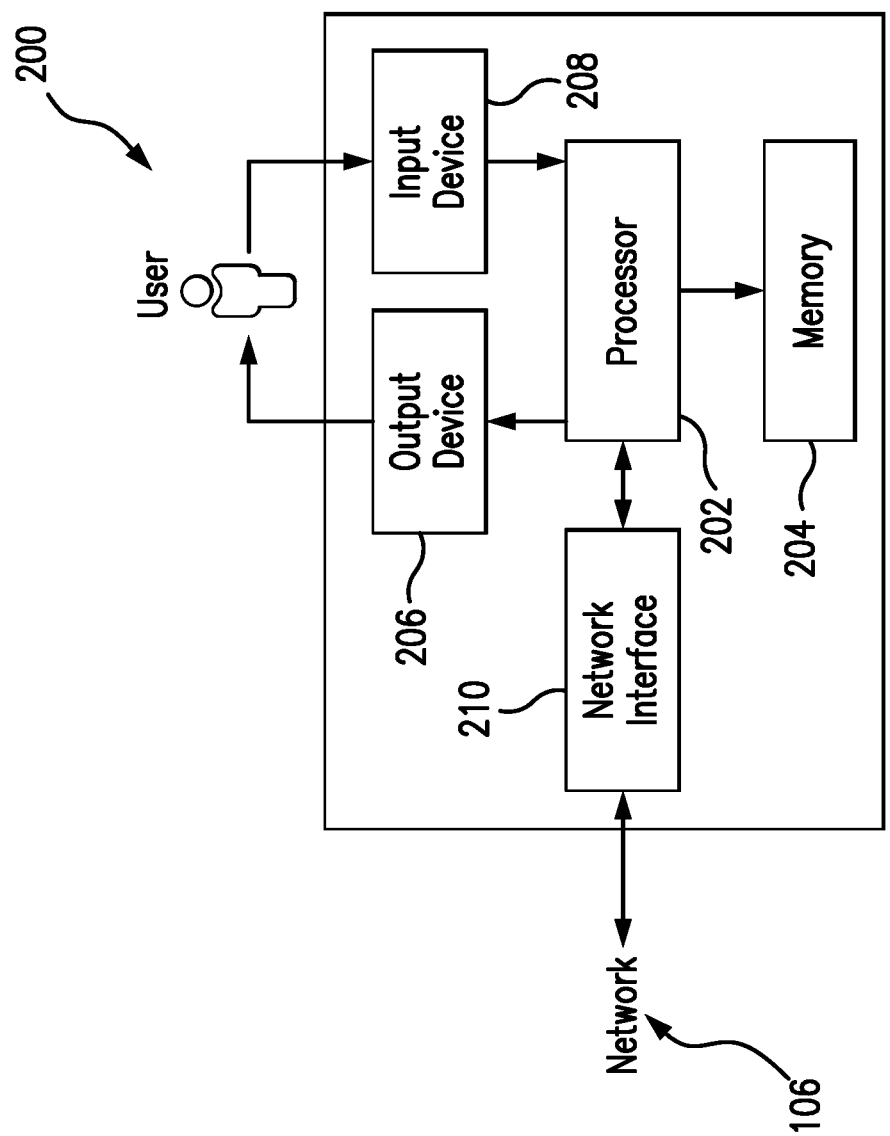
FIG. 2 is a block diagram of an exemplary computing device that may be used in the system of FIG. 1.

FIG. 2 illustrates an exemplary computing device 200, which may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the illustrated system 100, the payment network 102, the third party service provider 104, the service provider 112, and the service provider 114 each include and/or are implemented in, in whole or in part, computing device 200 (whereby, for example, the processor included therein is configured, by executable instructions, to operate as described herein). In addition, the exemplary communication device 108 associated with the individual 110 is generally consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, PII, rules, tags, instructions, data formats, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes an output device 206 that is coupled to (and that is in communication with) the processor 202. The output device 206 outputs information, such as responses including accountings of PII, etc., visually, for example, to users of the computing device 200, for example, the individual 110, a user associated with any of the entities illustrated in FIG. 1, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs), such as, for example, requests for accountings of PII, or the PII itself, etc. The input device 208 is coupled to (and is in communication with) the processor 202 and may include a single input device or multiple input devices. For example, the input device 208 may include one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks. Further, in some exemplary embodiments, the computing device 200 may include the processor 202 and one or more network interfaces incorporated into or with the processor 202.

Referring again to FIG. 1, the payment network 102 includes a management engine 116 configured, by executable instruction, to perform the operations described herein. In connection therewith, the management engine 116 may be implemented in the computing device 200 associated with the payment network 102, as indicated by the dotted designation in FIG. 1. As further shown, the management engine 116 is associated with a consent notice and rules structure 118, a restricted use management 120, a service profile management 122, and a data quality verification structure 124, each of which is embodied in a data structure within the payment network computing device 200, in this embodiment, as again indicated by the dotted designation. In connection therewith, the management engine 116 may be in communication with such data structures 118-124 via the network 106 or via one or more other networks (as generally indicated by the arrows therebetween). That said, the data structures associated with the consent notice and rules 118, the restricted use management 120, the service profile management 122, and the data quality verification 124 may be disposed in one or more other computing devices, alone or in combination, and may be located in close proximity to or distributed over a geographic distance from the management engine 116 (yet still be coupled in communication with the management engine 116 (e.g., via the network 106, etc.), etc.).

In general, the management engine 116 is configured to operate as a processor of PII. In connection therewith, the management engine 116 (or processor) is typically not a controller or owner of the PII. Rather, the service providers 104, 112, and 114 are the controllers (or owners) of the PII.

As explained above, the service providers 104, 112, and 114 are often exposed to PII, some of which is passed to other entities and some of which is stored by the respective service provider (in its corresponding computing device). Thereafter, the service providers 104, 112, and 114 register their PII to the management engine 116. Specifically, each of the service providers 104, 112, and 114 is associated with a service profile at the service profile management 122, upon registration to the management engine 116. The service profile is then built, between the management engine 116 and the service provider, to describe and enroll the PII, where the PII is relied on and/or utilized by the services provided by the service provider, and also controlled by the service provider. In this way, data related to the PII is added to the service profile for the given service provider at the service profile management 122. The service profile then includes a registry of the PII controlled by the service provider, where the PII is identified by a data element tag, a data element name and a data element description. The data element tags, names and/or descriptions will be consistent, in whole or in part, across the service profiles for different service providers, regardless of the format in which the PII is held by the service provider. The specific data elements are referred to herein as metadata. With that said, the PII may be maintained in a language in which it is received (such that the aggregate of the PII may be in multiple different languages), or the PII may be translated to a default or predefined language (e.g., English, etc.). It should be appreciated, however, that data element tags, names and or descriptions associated with the PII may, or may not, be translated to other languages. For example, where a data element tag, name and/or description is in the English language, the data element tag, name and/or description may be maintained in the English language and translated from English to French in response to a PII request from an individual whose native language is French and/or who is located in a French-speaking country, etc. In any case, in this manner, the management engine 116, through the service profiles, includes an inventory of the PII included in the system 100 along with a description of where the PII is located (e.g., at any of the service providers 104, 112, or 114, etc.).

Table 1 illustrates an exemplary data structure (i.e., a mapping data structure), which includes the names of data by association, between the service providers 104 and 114, for example, and the management engine 116. This data structure is stored in memory (e.g., memory 204) of the management engine 116. As should be understood, the data structure (and mappings therein), for example, provides "switching" between the data nomenclature used by each of the service providers 104 and 114 and the management engine 116.

TABLE 1

| Data Element Name | Servicer Provider 104 Name | Servicer Provider 114 Name |
| --- | --- | --- |
| Mobile Phone Number | Contact.Number.Mobile | Cell Phone Number |
| Home Phone Number | Contact.Number.Home | Residential Phone Number |
| Government ID | ID.Government | Government Identification |
| Birth Date | Personal.DOB | Date of Birth |
| Device ID | ID.Device | Device Identification |
| Email | Contact.Email | Electronic Mail Address |
| Surname | Personal.Surname | Family Name |

What's more, because of the common data definition, as defined by the data element tag, the data element name, and/or the data element description for PII data, one or more new services, from the service providers 104, 112, and 114, may be included in the system 100, used by the individual 110, and associated with the management engine 116, with no configuration and/or coding changes to the management engine 116 by virtue of the PII relied on and/or utilized by the new service being already defined in the service profile for the service provider.

Once the PII is registered to the management engine 116, and defined, the management engine 116 is configured to create, track and respond to PII requests, related to the PII and/or consent for the PII, etc., based on the different relationships a requestor has with the controllers of the PII (e.g., with one or more of the service providers 104, 112, and 114, etc.).

In connection therewith, to submit a request, the requestor (be it the individual 110, an employee, or a business is general) is presented with a consent screen, which includes a consent notification. Specifically, based on the consent notice and rules 118, the management engine 116 is configured to present a consent notice to the requestor, seeking the consent of the requestor to the notification in order for the management engine 116 to carry out the request. The consent notice and rules 118 may, for example, require the presentation of different consent notifications (stored by the data structure embodying the consent notice and rules 118, or elsewhere) for different PII requests, or may not require any consent notification if the requestor has previously consented to the applicable consent notification for the given PII request. As another example, even where the requestor has previously consented to a consent notification associated with the PII request, the consent notice and rules 118 may require presentation of a consent notification seeking the consent of the requestor (consistent with the above), when there is a new consent notification associated with the PII request (e.g., updated language, terms, etc.). It should be appreciated that as part of determining whether the requestor has previously consented to the applicable consent notification, the management engine 116 may be configured to make or broadcast a request(s) to other service providers 104, 112, and/or 114 (potentially, depending on the consent notice and rules 118 and/or the PII request) for consent confirmation, whereby the other service providers 104, 112 and/or 114 are configured to provide a response indicating whether the requestor has previously consented to the consent notification associated with the request. It should also be appreciated that where a requestor has consented to a particular consent notification, the management engine 116 may be configured to store an indication that the requestor consented to the particular notification (e.g., in the data structure embodying the consent notice and rules 118, etc.), such that the management engine 116 can later determine, in response to subsequent requests by the requestor, whether the requestor has already consented to the particular notification.

The requestor is provided with certain controls and/or actions related to PII within the system 100. The management engine 116, in turn, is configured to implement such controls and/or actions. In particular, for example, the management engine 116 may be configured to provide notification (e.g., construct and publish consent notices/requests and support accept, reaccept, and/or decline rules (consistent with the above); etc.), rules enforcement, access/changes, and opt-out controls related to consent management for the use of PII in the system 100. In general, the management engine 116 is configured to provide system-wide consent features with audit control to ensure and/or aid in verification of consent being provided, declined, and/or offered, whereby the requestor may be able to limit consent. What's more, the management engine 116 may be configured to provide individual data access controls, whereby the requestor is able to request an accounting of PII (i.e., a collect and report request), to port PII from one service to another (i.e., a port request), to scrub PII from the system (i.e., a scrub request), or even make changes to PII (i.e., a change request). Despite the variety of different controls, the management engine 116 as shown in FIG. 1 is described with reference to a request for accounting of PII (i.e., a collect and report request). It should be appreciated that the other requests described herein will be processed in generally the same manner and may include one or more of authentication of the requestors, queries to the respective profiles, broadcasts of requests (or directions), replies to the requests and audits of the interactions related to the requests.

As an example, when the individual 110 desires to receive an accounting of his/her PII, the individual 110 submits a request, via the communication device 108, to the management engine 116 (along path A in FIG. 1) to collect and report PII (e.g., a business to employee (B2E) request, a business to customer (B2C) request, or a business to business to customer (B2B2C) request, etc.). Often, the request will be submitted through one or more interfaces, provided by and/or from the management engine 116, whereby the individual 110 provides identifying information and/or sign-in credentials. In connection therewith, the third party service provider 104 (as the issuer of the payment account associated with the individual) may be configured to interact with the individual 110 to solicit the request (e.g., through one or more interfaces, etc.), and to pass the request to the payment network 102 and, specifically, the management engine 116 (rather than the individual 110 interacting directly with the payment network 102). It should be understood that the request may originate from service providers 112 or 114, or the third party service provider 104 (e.g., business to business (B2B) request, etc.) in which the request may include a request for access to certain PII of the individual 110 and others. The service provider may be configured to submit the request automatically, for example, in connection with one or more services, or manually, by a user associated with the service provider, whereby the request may be provided through one or more interfaces.

In response to the request from the individual 110, the management engine 116 is configured, directly, or via one of the service providers 112 and 114 within the payment network 102, to initially authenticate the individual 110 prior to permitting the request to be compiled and/or received by the management engine 116. The management engine 116 may be configured to host a single sign-on (SSO) authentication, or may be configured to rely on the service provider 104, for example, to authenticate the consumer prior to or after accepting the request.

Then, once the request is received, the management engine 116 is configured, based on the consent notice and rules 118, to present any consent notifications associated with the request and to obtain the consent of the individual 110.

The management engine 116 is also configured, after obtaining the consent of the individual 110 to any consent notifications associated with the request, to query the restricted use management 120. In particular, certain PII may be subject to a number of restrictions related to governmental regulations and/or court orders (e.g., litigation holds, etc.), which are included in the restricted use management 120, whereby access to and/or alteration of PII may be prohibited and/or limited. As such, by querying the restricted use management 120, the management engine 116 is configured to determine any use restrictions of the PII and to limit the request to those restrictions. It should be appreciated, however, that the management engine 116 may be configured to query the restricted use management 120 at any appropriate time (e.g., before presenting any consent notifications, or later).

In addition, the management engine 116 is also configured to query the service profile management 122. In particular, the request received by the management engine 116 is from the individual 110, and therefore will be limited to privileges associated with the individual 110 and any affiliation of the individual 110 (as provided in the service profile management 122). In querying the service profile management 122, the management engine 116 is configured to determine any restrictions on the PII sought by the individual 110 and to limit the request to those restrictions. Example restrictions may include limiting the request to PII related to the individual 110, or limiting the request to the PII for the individual 110 and also a particular entity submitting the request (e.g., the third party service provider 104, etc.), etc. For example, the individual 110 (e.g., John Smith, etc.) may be a customer at the third party service provider 104 (e.g., a banking institution (e.g., Bank A, etc.), etc.) and also a user of a service provided by the service provider 112. (e.g., virtual wallet service, etc.). The service profile management 122 causes the management engine to realized two individuals: John Smith at Bank A and John Smith at service provider 112. As such, a request for PII for John Smith received at the payment network 102 is directed to John Smith at the service provider 112, while a request received through Bank A, is directed to John Smith at Bank A. As such, the request may be limited based on the type of request and/or the content of the PII, and also based on the requestor (individual, employee, or business affiliated with the requestor) submitting the request.

Once properly restricted, if applicable, the management engine 116 is configured to broadcast the request along path B to one or more of the service providers 104, 112, and 114. In particular in the system 100, the management engine 116 is configured to broadcast the request via an application programming interface (API) and/or a Pub/Sub communication channel(s) associated with each or multiple of the service providers 104, 112, and 114, as permitted by the restrictions, for example, imposed by the service profile management 122. That said, the management engine 116 is configured to broadcast the request to the controllers of the PII responsive to the request. In other exemplary embodiments, other channels of communication between the management engine 116 and the various service providers 104, 112, and 114 may be employed. It should be appreciated that where the request for PII is received from a third party service provider (e.g., service provider 104, etc.), the request may be broadcast to a further third-provider provider (and/or, potentially, the third party service provider itself).

In response to the broadcast, the service provider 112, for example, is configured to examine the broadcasted request, identify the PII associated with the request and to provide a responsive accounting of the PII to the management engine 116. In this example, the service provider 112 is configured to provide an account of the PII through metadata associated with the PII along with the PII in response to the request. The third party service provider 104 and the service provider 114 are similarly configured to provide a responsive accounting for PII, at the respective service providers, to the management engine 116 (or to take the requested action and then to provide a response), which, in general, includes the PII. Upon receipt of the response from the service provider 112, the management engine 116 may be configured to query the data quality verification 124. In turn, the management engine 116, based on the data quality verification 124, is configured to determine if the response received from the service provider 112 conforms to the required format and/or content expected. If not, the management engine 116 is configured to generate an error notification to a user associated with the management engine 116, the associated service provider 112 and/or the individual 110 (in connection with a reply), etc. Again, these operations are similarly performed by the third party service provider 104 and the service provider 114.

If each of the responses from the service providers 104, 112, and 114 conforms, however, the management engine 116 is configured to compile a reply to the individual 110 and to transmit the reply to the individual 110 (directly or via the third party service provider 104, if received therefrom). Likewise, if the request relates to an action or control (other than an accounting), the management engine 116 is configured to compile the reply, reflecting the same, and transmit the reply to the individual 110 (again directly or via the third party service provider 104, if received therefrom).

It should be appreciated that the management engine 116 may be configured to further generate an audit log for the request from the individual 110 and/or the third party service provider 104, whereby some or all interactions related the request are logged. In particular, the management engine 116 may be configured to record, in an audit data structure in memory (e.g., the memory 204, etc.) (not shown), the receipt and details of the request (e.g., information regarding the requestor, time/date of receipt of the request, the requested PII action and/or control, etc.), the subsequent interactions with each of the restricted use management 120, the service profile management 122 and the data quality verification 124, along with the interactions with the service providers 104, 112, and 114. The management engine 116 may be configured to then further record, in the audit data structure, all results received from the service providers 104, 112, and 114, which may include PII, metadata related to PII, or confirmations of actions taken, or not, etc.

Figure 3:
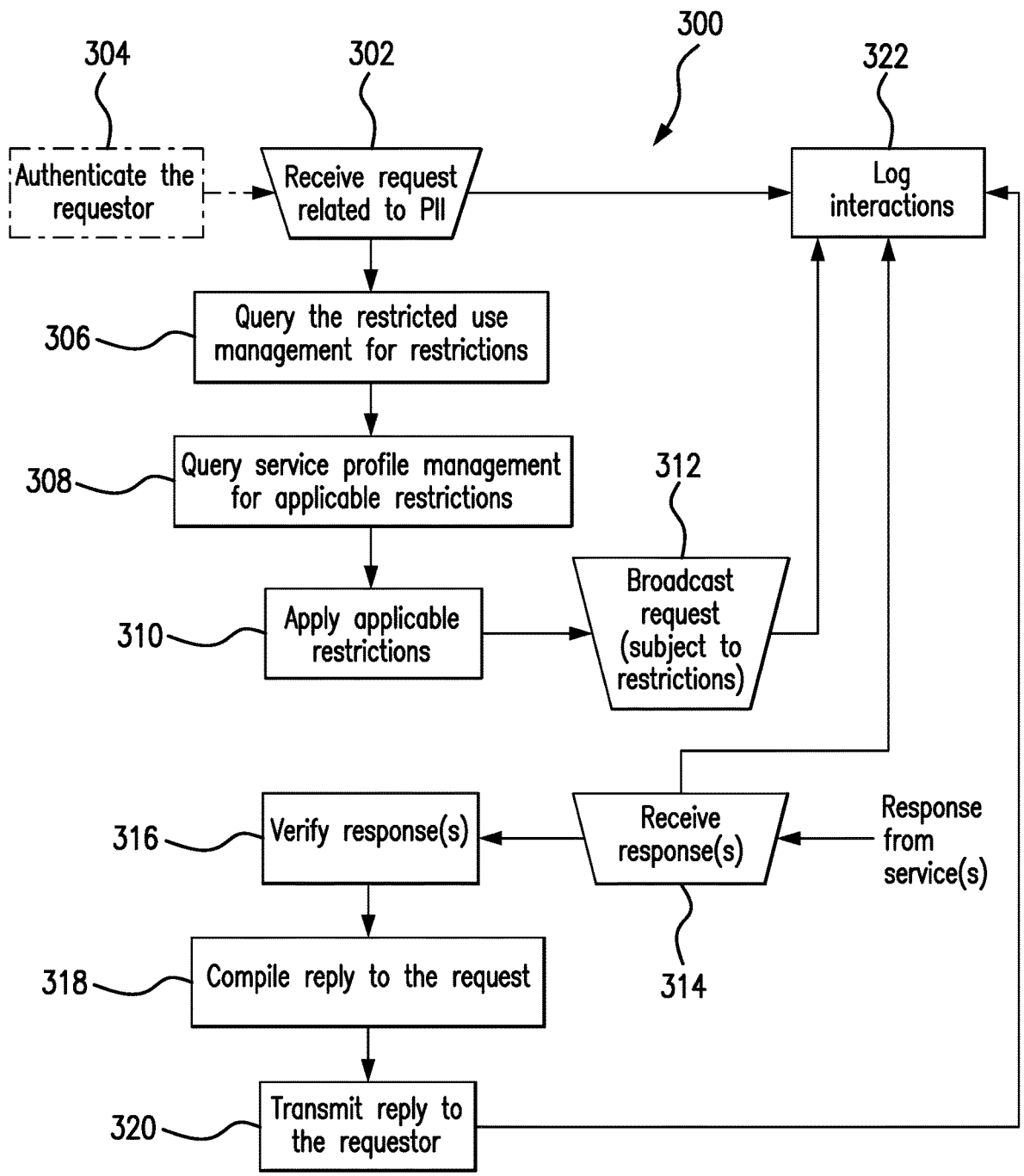
FIG. 3 is an exemplary method for use in managing personal identifying information, which is gathered and/or known in connection with one or more network transactions, and which may be implemented via the system of FIG. 1.

FIG. 3 illustrates an exemplary method 300 for managing PII and/or data structures containing the PII. The exemplary method 300 is described (with reference to FIG. 1) as generally implemented in the management engine 116 and the service providers 104, 112, and 114 of the system 100, and with further reference to the computing device 200 of FIG. 2. As should be appreciated, however, the methods herein should not be understood to be limited to the exemplary system 100 or the exemplary computing device 200, and the systems and the computing devices herein should not be understood to be limited to the exemplary method 300.

As shown in FIG. 3, at 302, the management engine 116 receives a request from a requestor, where the request is related to PII. As explained above, the request may be received from the individual 110 and may be related to an accounting of PII for the individual 110, where the request is for collection and reporting of the PII. Alternatively, the request may be received from the third party service provider 104, for example, for PII related to one or more customers (e.g., including the individual 110, etc.). Still further, the request may be received from an employee of the payment network 102, etc. In any case, as the requestor changes, the management engine 116 may receive the request directly (e.g., from the individual 110, the third party service provider 104, the employee, etc.) or indirectly (e.g., the individual 110 may submit the request via the third party service provider 104, etc.). The request may be related to access or accounting of PII, or may be related to removal of PII, or may be related to porting of PII to another service, another service provider and/or another entity, etc. In general, though, the management engine 116 will receive the request based on a relationship with the requestor or an intermediate of the requestor (again, for example, third party service provider 104, etc.).

Upon receipt of the request, or prior, the management engine 116 optionally (as indicated by the dotted lines in FIG. 3) authenticates the requestor, at 304. The authentication may include verification of login credentials (e.g., a username, a password, etc.), a biometric, a personal identification number (PIN), a one-time password, etc. In the situation where the request is received indirectly, the management engine 116 may rely of authentication by the intermediate of the requestor having a relationship with the requestor, rather than performing the authentication directly at 304.

In some embodiments, the management engine 116, in response to the request, may present a consent notification to the requestor, based on the consent notice and rules 118, in order for the management engine 116 to carry out the request. In these embodiments, the management engine 116 may then receive consent to the consent notification from the requestor (consistent with the description provided above in the system 100).

Thereafter, the management engine 116 queries the restricted use management 120, at 306, for particular restrictions related to the request. Specifically, for example, the restricted use management 120 includes rules related to restrictions on the PII, such as, for example, litigation holds, data retention policies, contractual obligations, geographic-based restrictions, or other suitable restrictions, etc. For example, when the request includes a data removal request, a litigation hold restriction may prevent the service provider 104 from removing or deleting data, for example, as part of a ligation hold, by which all data related to a litigation is required to be maintained during the pendency of the litigation. The query is submitted, by the management engine 116, as an API call to the restricted use management 120, in method 300, but may be submitted otherwise in other method embodiments.

In addition, the management engine 116 queries the service profile management 122, at 308, for restrictions related to the request. In the service profile management 122, the management engine 116 determines the identity of the requestor, and the permissions of the requestor to request, change and/or scrub, etc. PII from services coupled to and/or included in the payment network 102. For example, when the requestor is the individual 110, the service profile management 122 may include restrictions, which permit only PII for which the payment network 102 is the controller to be reported (thereby permitting PII from the service provider 112 and the service provider 114 to be reported). That is, restrictions may still omit PII controlled by the third party service provider 104 (even if related to the individual 110) from being reported. Similarly, when the requestor is the third party service provider 104, the service profile management 122 may include restrictions, which permit only PII where the third party service provider 104 is the controller to be reported in response to the request.

As another example, when the requestor is the individual 110 and there is a legal issue involving the individual 110 (e.g., a litigation hold, etc.), the service profile management 122 may include restrictions that permit the PII for that individual 110 only to be requested, and not scrubbed and/or changed. As an additional example, where a request would impede the business of the payment network 102, for instance, where the requestor is the individual 110 and the individual 110 has an account with the payment network 102 for services that rely on PII (e.g., a Masterpass account, etc.), the service profile management 122 may include restrictions that permit certain PII for that individual 110 only to be requested and/or changed, and not scrubbed. As a further example, anti-money laundering laws and/or regulations may preclude the service profile management 122 from allowing certain information to be changed and/or scrubbed in response to requests. Again, the query is submitted, by the management engine 116, as an API call to the service profile management 122, in method 300, but may be submitted otherwise in other method embodiments.

Then, at 310, the management engine 116 applies the restrictions from the restricted use management 120 and the service profile management 122 to the request. In turn, the management engine 116, at 312, broadcasts the request (with the restrictions) to the services in communication therewith, including, for example, the service providers 112 and 114 and the third party service provider 104. The requests are broadcast, in general, by the management engine 116 through an API and/or the Pub/Sub communication channel(s), where the particular API and/or Pub/Sub communication channel(s) used for broadcasting the request are based on the particular service providers 104, 112, and/or 114. Further, the broadcast requests to each of service providers 104, 112, and/or 114 are formatted such that they include the PII data nomenclature used by the each of the service providers, based on mappings identified in a data structure in memory (e.g., memory 204, etc.) of the management engine 116 (consistent with the discussion in the system 100 related to example Table 1 above). As explained above, the request will be broadcast, by the management engine 116, to the service providers permitted by the service profile management 122, which may be understood to be the relevant service providers for the request.

Next, each of the service providers 104, 112, and 114 in receipt of the broadcast request determines if any PII, for which it is a controller, is responsive to the request. If one or more of the service providers 104, 112, and 114 is not a controller of any relevant PII, the service provider provides a response back which indicates no such information (e.g., "null", etc.). If one or more of the service providers 104, 112, and 114 is a controller of relevant PII, however, the service provider provides a response. The response may include, for example, PII, metadata related to the PII, or a compliance statement (e.g., an acknowledgement, etc.) indicating that a request to transfer or scrub PII has been completed (or not), etc Like the request, the response will be transmitted back to the management engine 116 through the API and/or the Pub/Sub communication channels. Each of the responses from the relevant service providers is provided in a specific format having metadata and data in the response, or a null or none response indicating that the service provider has no such PII.

With continued reference to FIG. 3, the responses from the service providers 104, 112, and 114 are received at the management engine 116, at 314. The management engine 116, upon receipt of the responses, from each of the relevant service providers verifies, at 316, the response based on the data quality verification 124, which includes rules and/or formats regarding the expected and/or required data and formatting for the responses to be received from the service providers 104, 112, 114. The rules and/or formats are based on the particular service provider 104, 112, or 114 returning the response. Specifically, for example, if the data and/or formatting returned by one of service providers 104, 112, or 114 is not consistent with one or more rules and/or formats associated with the returning service provider 104, 112, or 114, the inconsistent data and/or formatting will be flagged for further review (e.g., by privacy personnel, etc.).

When the response(s) are verified, the management engine 116 compiles a reply to the request, at 318, and transmits, at 320, the reply to the requestor. The reply will generally be commensurate with the request. As such, when the request is directed to specific PII (e.g., of individual 110, etc.), the reply may include the requested PII in a file of suitable machine readable format (e.g., XML, JSON, etc.). When the request is for an accounting of PII (e.g., of individual 110, etc.), the reply may include an accounting statement of the PII, whereby, for example, all of the PII is included (e.g., for individual 110, etc.) in the reply. When the request is for porting or movement of the PII (e.g., all of the PII for the individual 110, etc.), the reply may include all of the PII (e.g., of individual 110, etc.), thereby allowing the PII to be ported or moved (e.g., whereby, at the request of the individual 110, for example, all of the PII for the individual 110 may be gathered and moved to another service provider for storage/management; etc.). When the request is received directly from the requestor, the reply will often be transmitted, by the management engine 116, directly to the requestor Likewise, when the request is received indirectly from the requestor, the reply will often be transmitted, by the management engine 116, to the requestor via the intermediate through which the request was received. It should be appreciated that where a reply includes requested PII, the reply may be formatted such that the PII can be displayed in a viewable and understandable format to the requestor (e.g., the individual 110, etc.). In this manner, the reply may be compiled, in part, by "switching" between the data nomenclature used by each of the service providers 104, 112, and/or 114 that responded with PII and the data nomenclature used by the management engine 116, based on mappings identified in a data structure in memory (e.g., in memory 204, etc.) of the management engine 116 (consistent with the discussion related to example Table 1 above). It should also be appreciated that the reply may include, in addition or in the alternative to PII itself, information related to the PII, such as the location of where the PII is controlled (e.g., the particular service provider 104, 1122, and/or 114 controlling the PII, etc.) and/or a summary or description of the PII.

What's more, in connection with method 300, the management engine 116 logs, at 322, all interactions with the requestor and service providers 104, 112, and 114 related to any request to the audit data structure, to permit auditing and monitoring. That is, for example, the management engine 116 logs the request (and the data therein) upon receipt from the requestor (e.g., the individual 110, etc.) and/or the service providers 104, 112 or 114, and also the broadcast request(s) (and data therein) to each of the relevant service providers, the response from the relevant service providers (e.g., PII, accountings, removal acknowledgements, etc.), time and/or date stamps for the request and broadcast request(s), any identification verification issues for the responses, time and/or date stamps for the responses, and then, also, the reply to the requestor (e.g., the requesting individual 110, etc.) and/or the service providers 104, 112 or 114, as well as a time and/or date stamp for the reply.

In view of the above, systems and method herein provides for management of PII obtained/collected in connection with such network transactions at a centralized location, whereby the individuals (e.g., consumers, customers, employees, employees of consumers/customers, etc.) and/or entities (broadly, requestors) involved in the transactions may request different actions and/or controls related to the PII. Through implementation of the PII at the centralized location, responses to the requests are more likely to be consistent with applicable restrictions for the requestors and/or the individuals' PII.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, from a requestor, a request related to personal identifying information (PII) for at least one individual, the at least one individual associated with a service; (b) determining, by a computing device, whether a restriction on the PII or the at least one individual applies to the request; (c) broadcasting, by the computing device, the request, subject to the determined restriction when the restriction is determined to apply to the request, to at least one service provider of the service, the at least one service provider being a controller of PII of the at least one individual; (d) compiling, by the computing device, a reply to the request based on a response from the at least one service provider, the reply including the PII; (e) transmitting the reply to the requestor; and (f) logging, by the computing device, multiple interactions related to the request in an audit data structure, thereby permitting compliance with PII controls to be demonstrated.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing personal identifying information, the method comprising:
    receiving, from a requestor, a request to remove personal identifying information (PII) for at least one individual from multiple service providers;
    in response to the request, authenticating, by a computing device, the requestor, the requestor including a third party service provider of a service to the at least one individual;
    determining, by the computing device, a restriction applies to the request;
    wherein determining the restriction applies to the request includes identifying the restriction based on the third party service provider and the at least one individual; and
    broadcasting, by the computing device, the request, subject to the determined restriction, to the multiple service providers, whereby, in response to the request, the multiple service providers remove the PII for the at least one individual from a memory associated with the multiple service providers;
    receiving, by the computing device, at least one response to the request from each of the multiple service providers, each response including an indication of removal of the PII of the at least one individual from the memory associated with the respective one of the multiple service providers;
    verifying, by the computing device, the at least one response to the request from each of the multiple service providers, based on a format and/or a content of the at least one response;
    based on verification of the at least one response, compiling, by the computing device, a reply to the request based on the at least one response from each of the multiple service providers, the reply including a confirmation of removal of the PII for the at least one individual;
    transmitting the compiled reply, which includes the confirmation of removal of the PII for the at least one individual, to the requestor; and
    logging, by the computing device, the request from the requestor, authentication of the requestor, and the at least one response from each of the multiple service providers in an audit data structure, thereby permitting compliance with PII controls to be demonstrated.

2. The computer-implemented method of claim 1, wherein determining the restriction applies includes identifying a restriction on the PII based on the at least one individual from a restricted use management data structure.

3. The computer-implemented method of claim 1, wherein the request further includes a request to return the PII; and
    wherein the at least one individual includes multiple individuals.

4. The computer-implemented method of claim 1, wherein broadcasting the request, subject to the determined restriction, further includes broadcasting the request to the third party service provider.

5. The computer-implemented method of claim 1, wherein the request further includes a request to return the PII; and
    wherein the at least one response to the request, from each of the multiple service providers, further includes PII and metadata related to the PII.

6. The computer-implemented method of claim 1, further comprising:
    in response to receiving the request to remove the PII for the at least one individual, transmitting a consent notification to the at least one individual for consent of the at least one individual to remove the PII; and
    receiving the consent of the at least one individual to the consent notification, prior to broadcasting the request.

7. The computer-implemented method of claim 1, further comprising logging, by the computing device, the broadcasting of the request in the audit data structure.

8. A non-transitory computer-readable storage medium including executable instructions for managing personal identifying information, which when executed by at least one processor, cause the at least one processor to:
    receive, from a requestor, a request to remove personal identifying information (PII) for at least one individual from multiple service providers, the multiple service providers being controllers of the PII of the at least one individual;
    authenticate the requestor, the requestor including a third party service provider of a service to the at least one individual;
    when the requestor is authenticated, determine a restriction applies to the request;
    wherein in order to determine the restriction applies to the request, the at least one processor identifies the restriction based on the third party service provider and the at least one individual; and broadcast the request, subject to the determined restriction, to the multiple service providers;

receive at least one response to the request from each of the multiple service providers, each response including an indication of removal of the PII by the respective one of the multiple service providers;

verify the at least one response to the request from each of the multiple service providers, based on a format and/or a content of the at least one response;

based on verification of the at least one response, compile a reply to the request based on the received at least one response from each of the multiple service providers, the reply including confirmation of removal of the PII from the multiple service providers;

transmit the reply to the requestor; and log at least the request from the requestor, authentication of the requestor, and the at least one response from each of the multiple service providers in an audit data structure, thereby permitting compliance with PII controls to be demonstrated.

9. The non-transitory computer-readable storage medium of claim 8, wherein the at least one individual is associated with a plurality of services, and wherein the multiple service providers are each associated with one or more of the plurality of services.

10. The non-transitory computer-readable storage medium of claim 9, wherein the executable instructions, when executed by the at least one processor, further cause the at least one processor to identify, from a restricted use management data structure, the restriction on the PII based on the at least one individual, prior to determining the restriction applies to the request.

11. The non-transitory computer-readable storage medium of claim 8, wherein the request further includes a request to return available PII; and wherein the at least one individual includes multiple individuals.

12. The non-transitory computer-readable storage medium of claim 8, wherein the executable instructions, when executed by the at least one processor, further cause the at least one processor to log the broadcast of the request to the multiple service providers in the audit data structure.

13. The non-transitory computer-readable storage medium of claim 8, wherein the request further includes a request to return available PII; and wherein the at least one response to the request from each of the multiple service providers further includes PII and metadata related to the PII.

14. The non-transitory computer-readable storage medium of claim 8, wherein the executable instructions, when executed by the at least one processor, cause the at least one processor to:

in response to the request, transmit a consent notification to the at least one individual for consent related to the PII; and receive the consent of the at least one individual, prior to broadcasting the request.

\* \* \* \* \*